United States Patent [19]

Laing et al.

[11] 4,352,646
[45] Oct. 5, 1982

[54] ROTODYNAMIC PUMP WITH SPHERICAL MOTOR

[76] Inventors: Ingeborg Laing; Nikolaus Laing, both of 7141 Aldingen bei Stuttgart, Hofener Weg 35-37, Fed. Rep. of Germany

[21] Appl. No.: 238,855

[22] Filed: Feb. 27, 1981

Related U.S. Application Data

[63] Continuation of Ser. No. 820,446, Aug. 1, 1977, abandoned, which is a continuation-in-part of Ser. No. 648,580, Jan. 12, 1976, abandoned.

[30] Foreign Application Priority Data

Jan. 13, 1975 [AT] Austria .................................. 180/75

[51] Int. Cl.$^3$ ............................................. F04B 17/00
[52] U.S. Cl. ................................................ 417/420
[58] Field of Search ........................................ 417/420

[56] References Cited

U.S. PATENT DOCUMENTS 3,195,467  7/1965  Collet ................................ 417/420
3,490,379  1/1970  Laing ................................. 417/420
3,649,139  3/1972  Laing ................................. 417/420
3,710,156  1/1973  Laing ................................. 417/420
3,741,690  6/1973  Laing ................................. 417/420
3,762,839  10/1973 Laing ................................. 417/420
3,838,947  10/1974 Laing ................................. 417/420

FOREIGN PATENT DOCUMENTS 1188941  4/1970  United Kingdom .

Primary Examiner—Carlton R. Croyle
Assistant Examiner—Edward Look
Attorney, Agent, or Firm—Pennie & Edmonds

[57] ABSTRACT

A pump-motor unit of the type having an impeller connected to an armature and where the armature is separated from a stator by an air gap. The armature comprises a magnetic material having sufficient residual flux density whereby when the torque load on the impeller-armature structure is low, the magnet will act as a permanent magnet to provide synchronous rotation of the armature with respect to magnetic flux generated by the stator and when the torque load on the impeller-armature structure is high, will allow magnetic reversal whereby the armature will rotate asynchronously with respect to the magnetic flux generated by the stator.

2 Claims, 2 Drawing Figures

PRIOR ART

4,352,646

ROTODYNAMIC PUMP WITH SPHERICAL MOTOR

REFERENCE TO OTHER APPLICATIONS

This application is a continuation of our copending application Ser. No. 820,446 filed Aug. 1, 1977, now abandoned, which in turn is a continuation-in-part of our application Ser. No. 648,580 filed Jan. 12, 1976 now abandoned.

DESCRIPTION OF THE PRIOR ART

Electric motors having armatures with spherical surface which are separated by an air gap from stators having spherical surfaces are known in the art as spherical motors. Some spherical motors have a separating wall in the air gap for isolating the stator from the armature and are known as canned spherical motors. Spherical motors used with pumps may have the impeller connected with the armature to form a single unit. The impeller-armature unit is supported for rotation with respect to the stator by bearing means which allows the impeller-armature unit to tilt within limits about the bearing means.

A problem existing with utilizing spherical motor pumps as compared with conventional pumps having sealed shafts utilizing standard electric motors is that the slip of the armature with respect to the stator becomes large due in part to the air gap between the armature and the stator. This results in the rotational speed of the armature dropping far below the synchronous speed which is of particular significance in pumps because the hydraulic output of the pump varies with the third power of the rotational speed of the impeller. This drawback can be alleviated to some extent by using armatures with squirrel cage windings having conductors with large cross-sections. This however produces objectional noise due to the width of the conductor rods on the circumference of the armature.

A further difficulty in the use of such pumps utilizing induction-type armatures arises because 40% of the entire motor heat is generated in the armature itself. This is an important factor when the pumps are used for pumping liquids containing additives which crystallize out under the effect of heat as may occur if the armature becomes hot as may happen under conditions of substantial throttling of the throughput of the pump. When the pump is utilized to pump hot tap water, carbonates may crystallize from the hot water and become deposited in the gap between the armature and the stator.

A further problem existing with spherical motor type pumps as described above is that when the motor of the pump is switched off, the impeller-armature unit may then fall away from its spherical bearing. If the pump is mounted so that its impeller-armature unit rotates about a horizontal axis or is mounted with the impeller-armature below the stator, the impeller-armature unit will then fall from its bearing mounting making objectionable noise and, in some instances, resulting in damage to the armature. In some spherical motors referred to as canned motors, the stator is separated from the impeller-armature unit by a relatively thick separating wall which leads to large power losses.

It is therefore an object of our invention to provide for a pump utilizing a spherical motor in which armature losses are reduced. It is a further object of the invention to provide for a spherical pump-motor construction wherein the impeller-armature unit will be held in the bearing means supporting the unit notwithstanding the positioning of the pump when the pump is operating under low throughput conditions or is not operating at all.

GENERAL DESCRIPTION OF THE INVENTION

Broadly our invention comprises a pump-motor unit wherein the impeller is connected to the armature and where the armature is separated from a stator by an air gap. The armature comprises a permanent magnet having a residual flux density sufficient to provide synchronous rotation of the armature with respect to the magnetic flux generated by the stator at low torque loadings of the impeller, as occurs when the throughput of the pump is completely or substantially throttled. At the same time under high torque loadings of the impeller, as would occur when the throughput of the pump is high, the residual flux density is not so high as to prevent reversal of the flux density so as to allow the impeller-armature unit to rotate asynchronously with respect to the magnetic flux generated by the stator.

It is preferable to also have the residual flux density of the permanent magnet sufficiently high such that its magnetic attraction to the stator will support the weight of the impeller-armature unit in its bearing notwithstanding the positioning of the pump-motor unit.

DESCRIPTION OF THE PREFERRED EMBODIMENT

Figure 1:
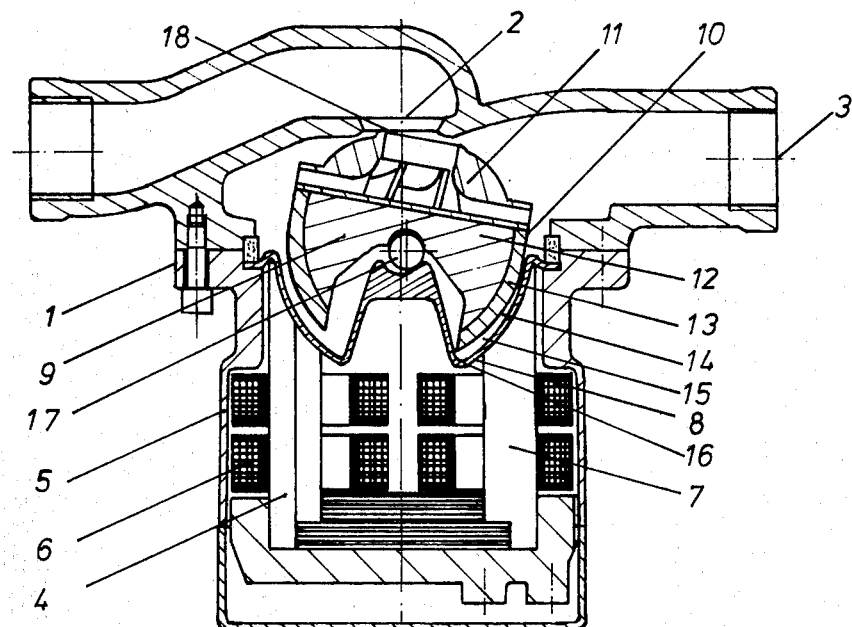
FIG. 1 is a cross-sectional view of a typical prior art pump-motor unit utilizing a spherical motor and having a squirrel cage armature.

Referring to FIG. 1 there is illustrated a pump-motor unit 1 having an inlet opening 2 and an outlet opening 3. The unit has a stator 4 contained within a housing 5 where the stator comprises coils 6 engaging pole pieces 7 which have a spherical surface 8. An impeller-armature unit 9 comprises a squirrel cage armature portion 10 which is joined to an impeller 11. The armature portion 10 has an iron core 12 as well as squirrel cage rods 13. The rods 13 have a spherical surface 14 and are separated from the spherical surface 8 of the pole piece by an air gap 15.

A separator wall 16 is included in the air gap and serves to isolate the stator from the fluid being pumped. The separator wall mounts a spherical bearing 17 about which the impeller-armature unit 9 may rotate and tilt within a few degrees.

As shown the pump-motor unit 1 is mounted so that the impeller-armature unit 9 rotates about a horizontal axis. When the motor is turned off, the impeller-armature unit drops under the force of gravity to the position shown in FIG. 1 such that the armature portion may engage the separator wall 16 and such that the inlet portion 18 of the impeller engages a part of the inlet opening 2 of the pump casing. This results in excessive wear of the parts during stopping and starting of the pump and also contributes to excessive noise generation. During operation the magnetic attraction between the armature and the stator is sufficient to support the impeller-armature unit on the bearing 17.

Figure 2:
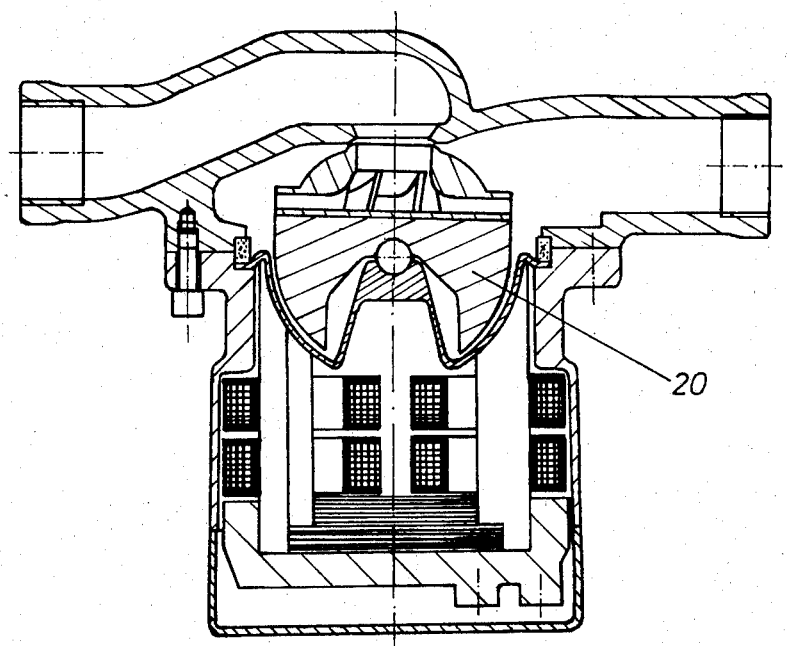
FIG. 2 is a cross-sectional view of a pump-motor unit constructed according to the invention.

Referring to FIG. 2 there is illustrated a pump-motor unit according to the invention wherein parts similar to parts shown in FIG. 1 are numbered the same. The pump-motor unit of FIG. 2 differs from that of FIG. 1 in that the armature portion of the impeller-armature structure comprises a permanent magnet 20 having a particular residual flux density. The flux density is such that when the pump is operating under a throttled condition wherein the throughput is completely or substantially throttled, no reversal of magnetism takes place within the armature and the armature rotates synchronously with respect to the magnetic flux generated by the stator. When the pump is unthrottled and there is substantial throughput through the pump, the torque load imparted by the impeller increases such that the armature slips with respect to the magnetic flux generated by the stator resulting in asynchronous rotation. The result of such operation is that in throttled conditions, there is a minimum of armature loss since there is no reversal of magnetism. This results in lower operating temperature of the armature.

When the output of the pump is substantially throttled and the impeller-armature unit is rotating synchronously with respect to the magnetic flux generated by the stator, the output pressure produced is much higher than if the pump were operating asynchronously. This is because output pressure increases by the square of the revolutions per minute of the impeller, and because, under throttled conditions the impeller rotates faster under synchronous conditions than under asynchronous conditions. The result is that for given pump dimensions, the output pressure of a pump-motor construction using our improved armature and under synchronous conditions is approximately 2.25 times that of the same pump using a squirrel cage type motor.

The magnet comprising the armature of FIG. 2 is preferably made of known alloys, for example nickel-cobalt and iron, or nickel-aluminum, cobalt and iron. Preferably the material comprising the armature has a coercivity between 150 and 500 oersted. Material of this coercive strength may have its polarity changed by alternating current flux generated by the stator so that the armature may work in the high torque regions of the impeller as an asynchronous armature. Still at the same time the coercivity is sufficient that the material comprising the armature will be strong enough to act as a permanent magnet when the motor is not in operation assuring that the impeller-armature unit is held onto the bearing 17 and also that in low throughput conditions when the pump is substantially throttled, the armature will act as a synchronous armature.

A further advantage of a pump constructed according to the invention is that since the armature comprises a homogenous magnetic material, it will have a smooth surface as compared with a squirrel cage armature thus reducing noise generation and windage losses. This is of particular importance when the pump is used as a circulating pump for heating installations.

Further from the point of view of geometry, an armature constructed according to the invention results in a smaller construction since closure rings utilized as conductor rods in squirrel cage armatures require relatively large volumes and weights of rotating parts.

Also an armature constructed according to the invention may be easily adapted for use in a corrosive atmosphere. Normally magnetic material having a coercive magnetic intensity sufficiently low to obtain the magnetic reversal when operated asynchronously has a high nickel content thus giving good corrosion resistance. Even when the material does not have a high nickel content, the material may be easily coated as by nickel plating due to the smooth surface of the armature. This is not possible with squirrel cage armatures because surfaces along which conductor material and ferrous material regions alternate have different thermal expansion coefficients.

We claim:

1. A pump motor unit of the type having a combined impeller-armature rotatably mounted on a bearing means adapted to pump a throughput through the unit and a stator for generating magnetic flux to exert a drive torque on the armature where the stator is separated from said armature by a spherical air gap; the improvement characterized in that the armature comprises a magnetic material the coercive force of which does not exceed substantially 500 oersteds and the residual flux density of which is set at an upper limit such that when the pump-motor unit is throttled and there is corresponding throughput through the unit resulting in a correspondingly low torque load on the impeller armature, the flux density will not reverse under the influence of magnetic flux generated by the stator whereby the magnetic material will act as a permanent magnet to provide synchronous rotation of the impeller-armature, and where the residual flux density of said magnetic material is also sufficient to hold said impeller-armature on said bearing means when the pump motor unit is not operating and the stator is not generating magnetic flux, and such that when the pump-motor unit is unthrottled and there is a correspondingly high throughput through the unit resulting in an increased torque load on the impeller-armature under the influence of magnetic flux generated by the stator, the flux density will reverse whereby the armature will no longer act as a permanent magnet but act similar to a squirrel cage armature to provide asynchronous rotation.

2. A pump-motor unit of the type having a combined impeller-armature adapted to pump a throughput through the unit and a stator for generating magnetic flux to exert a drive torque on the armature where said stator is separated from said armature by an air gap; the improvement characterized in that a portion of the impeller-armature adjacent the air gap has a spherical surface and a portion of the stator adjacent the air gap has a spherical surface and including in addition bearing means mounting said impeller-armature for rotation with respect to said stator, in that the armature comprises a magnetic material the coercive force of which does not exceed substantially 500 oersteds and the residual flux density of which is set at an upper limit such that when the pump-motor unit is substantially throttled and there is substantially low throughput through the unit resulting in a low torque load on the impeller-armature, the flux density will not reverse under the influence of magnetic flux generated by the stator whereby the magnetic material will act as a permanent magnet to provide synchronous rotation of the impeller-armature, and such that when the pump-motor unit is substantially unthrottled and there is a substantial throughput through the unit resulting in an increased torque load on the impeller-armature under the influence of magnetic flux generated by the stator, the flux density will reverse whereby the armature will act similar to a squirrel cage armature to provide asynchronous rotation, and in that the residual flux density of said magnetic material is also sufficient to hold said impeller-armature in said bearing means when the pump-motor unit is not operating and the stator is not generating magnetic flux.

* * * * *